(12) United States Patent
Michael et al.

(10) Patent No.: US 7,018,063 B2
(45) Date of Patent: Mar. 28, 2006

(54) SOLAR POWERED LIGHTING ASSEMBLY

(76) Inventors: Kenneth George Michael, 1560 Nipissing Court, Pickering Ontario (CA) L1V 6T9; Vernon George Michael, 18 Park Lane, Bayshore Village Ontario (CA) L0K 1B0

( * ) Notice: Subject to any disclaimer, the term of this patent is extended or adjusted under 35 U.S.C. 154(b) by 155 days.

(21) Appl. No.: 10/718,570

(22) Filed: Nov. 24, 2003

(65) Prior Publication Data

US 2004/0100794 A1    May 27, 2004

Related U.S. Application Data

(60) Provisional application No. 60/428,276, filed on Nov. 22, 2002.

(51) Int. Cl.
*F21L 13/00* (2006.01)
(52) U.S. Cl. .................... 362/183; 362/145; 362/191; 362/249; 362/269; 362/418; 362/432
(58) Field of Classification Search ................ 362/183, 362/188, 191, 145, 249, 250, 269, 285, 418, 362/427, 432
See application file for complete search history.

(56) References Cited

U.S. PATENT DOCUMENTS

| | | | | |
|---|---|---|---|---|
| 4,714,219 A | * | 12/1987 | Mayse | 248/65 |
| 4,744,019 A | * | 5/1988 | Krogsrud | 362/402 |
| 4,977,488 A | | 12/1990 | Spotts et al. | |
| 5,217,296 A | | 6/1993 | Tanner et al. | |
| 5,781,804 A | * | 7/1998 | Constable | 396/6 |
| 6,060,838 A | | 5/2000 | Cantoni et al. | |
| 6,563,269 B1 | | 5/2003 | Robinett et al. | |
| 6,601,984 B1 | | 8/2003 | Yamamoto et al. | |

* cited by examiner

*Primary Examiner*—John Anthony Ward
*Assistant Examiner*—Tsidulko
(74) *Attorney, Agent, or Firm*—Bereskin & Parr; Isis E. Caulder

(57) ABSTRACT

A solar powered lighting assembly for attachment to an eaves trough mounted on an outer wall surface includes a lamp, a rechargeable power source, a solar panel assembly, a mounting bracket and a connector arm. The rechargeable power source is connected to the lamp to provide operational power. The solar panel assembly is coupled to the rechargeable power source to provide electrical power for recharging the rechargeable power source. The mounting bracket is coupled to the inside surface of the eaves trough and is used to support the rechargeable power source and the solar panel assembly. The connector arm is coupled to the lamp and is adapted to be removeably coupled in between the eaves trough and the outer wall surface.

10 Claims, 8 Drawing Sheets

SOLAR POWERED LIGHTING ASSEMBLY

This application claims the benefit under 35 U.S.C. 119(e) of U.S. Provisional Application No. 60/428,276, filed Nov. 22, 2002.

FIELD OF THE INVENTION

This invention relates to a solar powered lighting assembly, and more particularly to a solar powered lighting assembly adapted to be mounted within an eaves trough.

BACKGROUND OF THE INVENTION

Conventional exterior pot-lighting are commonly used to achieve a desirable decorative soft ambient look for the outside of residential and retail buildings. In fact, halogen pot lights and other forms of high quality recessed lights have become the industry standard.

These kinds of external lighting assemblies often involve complex installation procedures, especially when there is insufficient house or building wiring available to power external lights. In such cases, electricians are required to assist in the design and installation processes and permits are required in order to make adjustments to the electrical work in a home or retail building. When installing lighting to the exterior of a home or retail building, a certified electrician is required to survey the home and inspect the existing wiring to ensure that the building and current wiring meets the specifications and requirements in order for them to proceed. The entire process is time consuming, inconvenient and expensive and the investment made is usually only for the period of time during which a building is occupied.

Further, since industry standard lighting sources are not always the most energy efficient light sources, installation of such lighting sources can result in high installation fees and a substantial increase in associated electricity costs. Additionally, the use of expensive light sources (e.g. halogen) for outdoor lighting applications can result in costly and disruptive damage and breakage due to adverse environmental conditions.

SUMMARY OF THE INVENTION

The invention provides in one aspect, a solar powered lighting assembly for attachment to an eaves trough mounted on an outer wall surface, said lighting assembly comprising:
(a) a lamp;
(b) a rechargeable power source coupled to said lamp to provide operational power to said lamp;
(c) a solar panel assembly connected to the rechargeable power source to provide electrical power for recharging the rechargeable power source;
(d) a mounting bracket coupled to the inside surface of the eaves trough for supporting said rechargeable power source and said solar panel assembly; and
(e) a connector arm coupled to said lamp, said connector arm containing at least one wedge-shaped protrusion for securing the connector arm between said eaves trough and said outer wall surface.

The invention provides in another aspect, a lighting assembly for attachment to an eaves trough mounted on an outer wall surface, said lighting assembly comprising:
(a) a lamp;
(b) a power source connected to said lamp to provide operational power to said lamp; and
(c) a connector arm coupled to said lamp, said connector arm containing at least one wedge-shaped protrusion for securing the connector arm between said eaves trough and said outer wall surface such that said lamp is positioned to provide light on the outer wall surface.

The invention provides in another aspect, a kit for assembling a solar powered lighting assembly for attachment to an eaves trough mounted on an outer wall surfaces, said kit comprising:
(a) a lamp;
(b) a rechargeable power source adapted to be coupled to said lamp to provide operational power to said lamp;
(c) a solar panel assembly adapted to be coupled to the rechargeable power source to provide electrical power for recharging the rechargeable power source;
(d) a mounting bracket adapted to be coupled to the inside surface of the eaves trough for supporting said rechargeable power source and said solar panel assembly; and
(e) a connector arm adapted to be coupled to said lamp, said connector arm containing at least one wedge-shaped protrusion for securing the connector arm between said eaves trough and said outer wall surface.

Further aspects and advantages of the invention will appear from the following description taken together with the accompanying drawings.

DETAILED DESCRIPTION OF THE INVENTION

Figure 1:
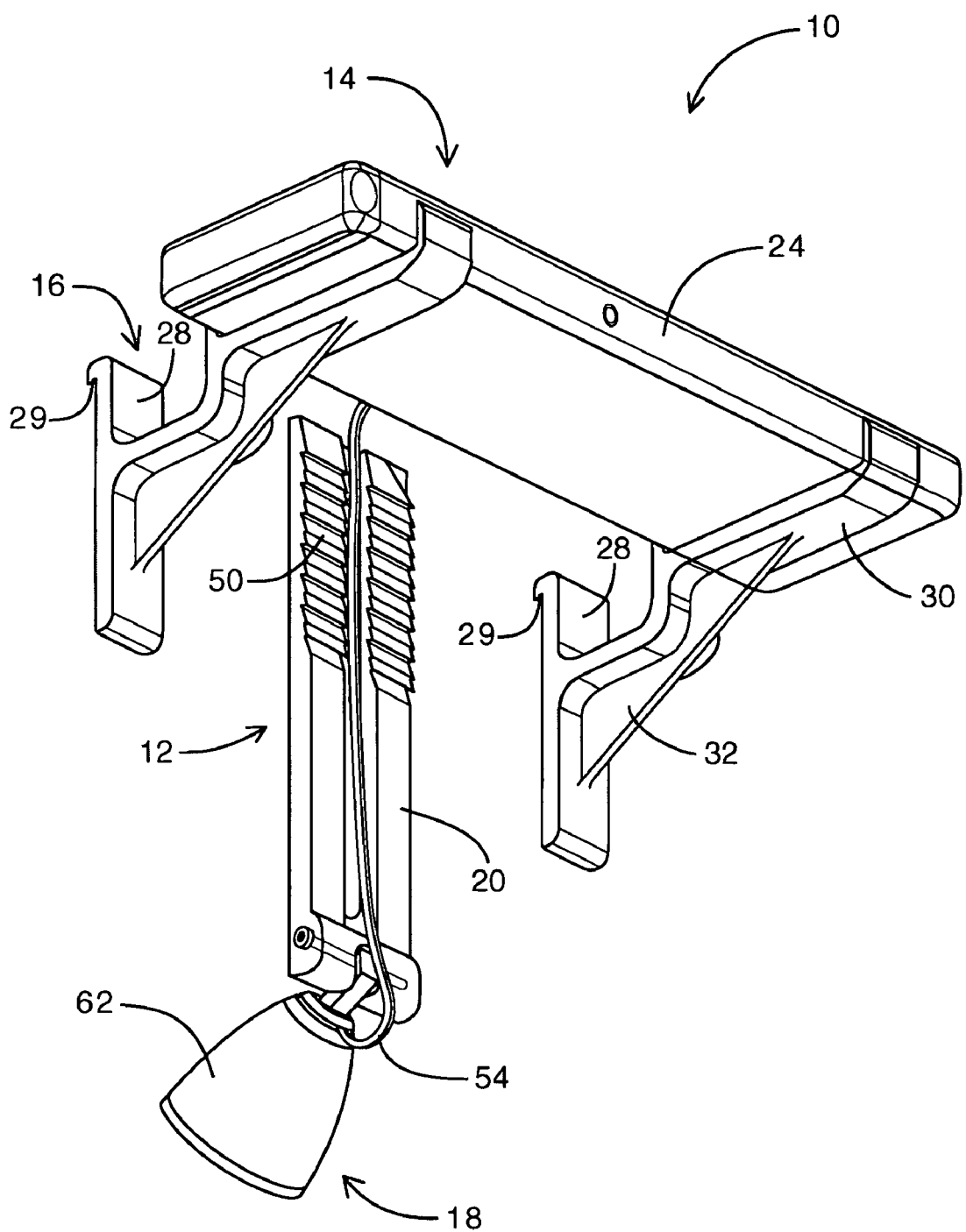
FIG. 1 is a bottom side perspective view of the solar powered lighting assembly of the present invention.
Figure 4:
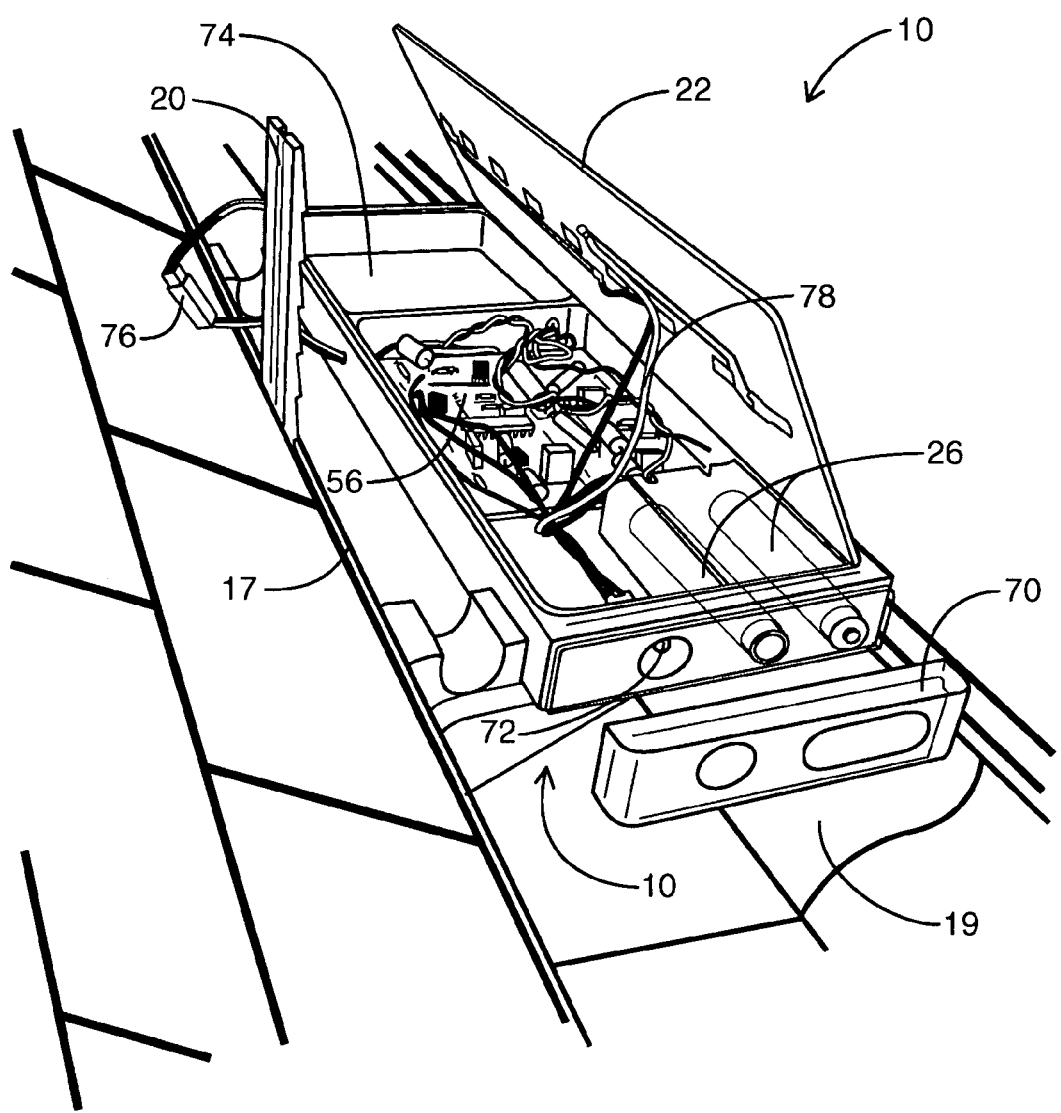
FIG. 4 is a side perspective view of the solar panel assembly of FIG. 1 in an open position to illustrate the internal elements of the solar panel assembly, when the solar powered lighting assembly is installed within an eaves trough.

Reference is first made to FIGS. 1, 2A, 2B, 3A, 3B and 4 that show various views of the solar powered lighting assembly 10 made in accordance with a preferred embodiment of the present invention. Solar powered lighting assembly 10 includes a lamp assembly 12, a solar panel assembly 14 and a pair of mounting brackets 16. Lamp assembly 12 includes a lighting element 18 and a connector arm 20 that is adapted to be removably secured between the outer wall surface 15 of an external wall and the inside wall 17 of an eaves trough 19. Solar panel assembly 14 includes a solar panel array 22, a solar panel housing 24 and a rechargeable power source 26 (FIG. 4). Mounting brackets 16 include an eaves trough connector 28, bracket support arms 30 and a brace element 32 (FIG. 1).

Lamp assembly 12 includes a lamp element 18 and a connector arm 20. Lamp element 18 (FIG. 3A) includes at least one lamp 60, a lamp housing 62, a lamp shield 64 and a lamp reflector 66. Lamp 60 is preferably an LED light source since LED light sources are relatively durable, lightweight, and long lasting due to their low power requirements. However, lamp 60 can be any other type of light generating source (e.g. halogen such as the MR11 halogen bulb with a 12 volt or 24 volt transformer, incandescent, etc.) Lamp housing 62 and lamp shield 64 are preferably manufactured out of durable clear plastic and adapted to form a waterproof housing to protect lamp 60 from environmental factors (e.g. rain, corrosion, shock impacts during storms etc.) Lamp shield 64 is specially manufactured out of durable scratch resistant plastic material and acts as a protective lens for lamp 60. Lamp shield 64 and lamp reflector 66 are used to help direct and disperse light downward and lamp shield 64 is used to prevent loss of light transmission from lamp 60 through lamp shield 64.

Lamp housing 62 is coupled to connector arm 20 at one end (FIG. 2B) through a rotation joint 57 and rotation pin 58 assembly. As is conventionally known, connector arm 20 includes a rotation cuff 59 within which is mounted rotation pin 58. Rotation joint 57 is rigidly coupled to lamp housing 62 as shown and can be moved rotatably around rotation pin 58.

Figure 2A:
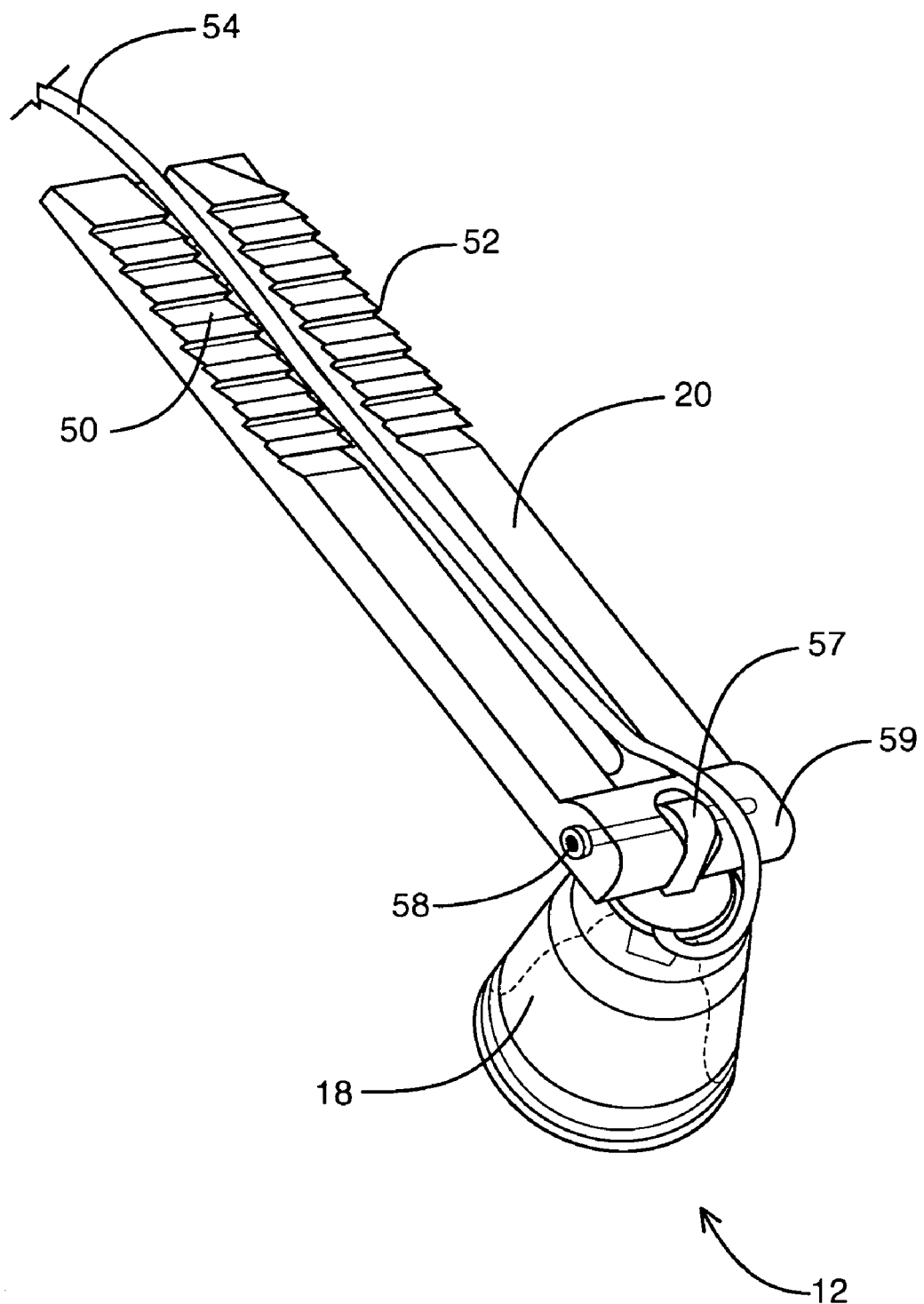
FIG. 2A is a side perspective view of the lamp assembly of FIG. 1.
Figure 2B:
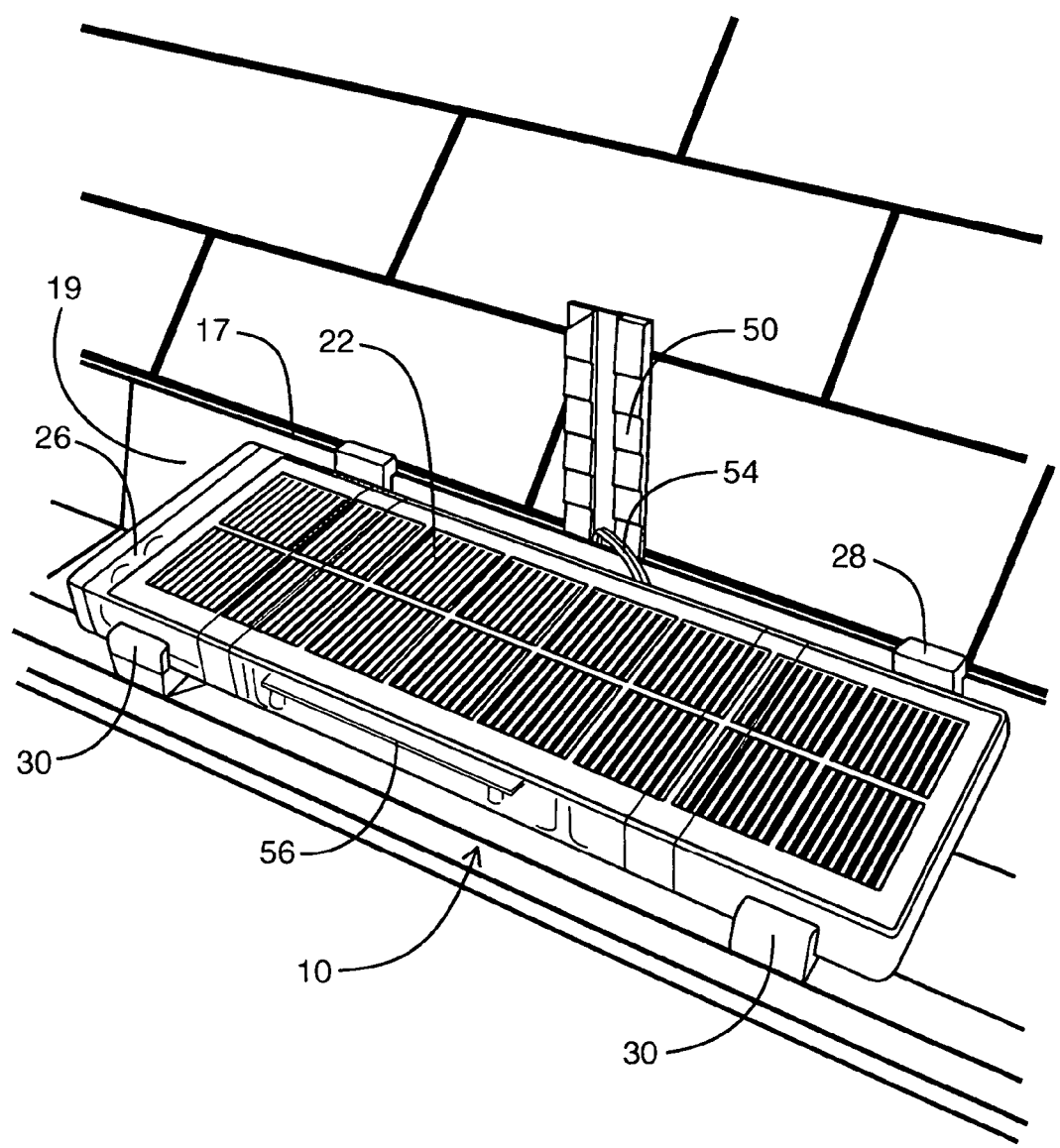
FIG. 2B is a top perspective view of the solar powered lighting assembly of FIG. 1 when the solar powered lighting assembly is installed within an eaves trough.
Figure 3A:
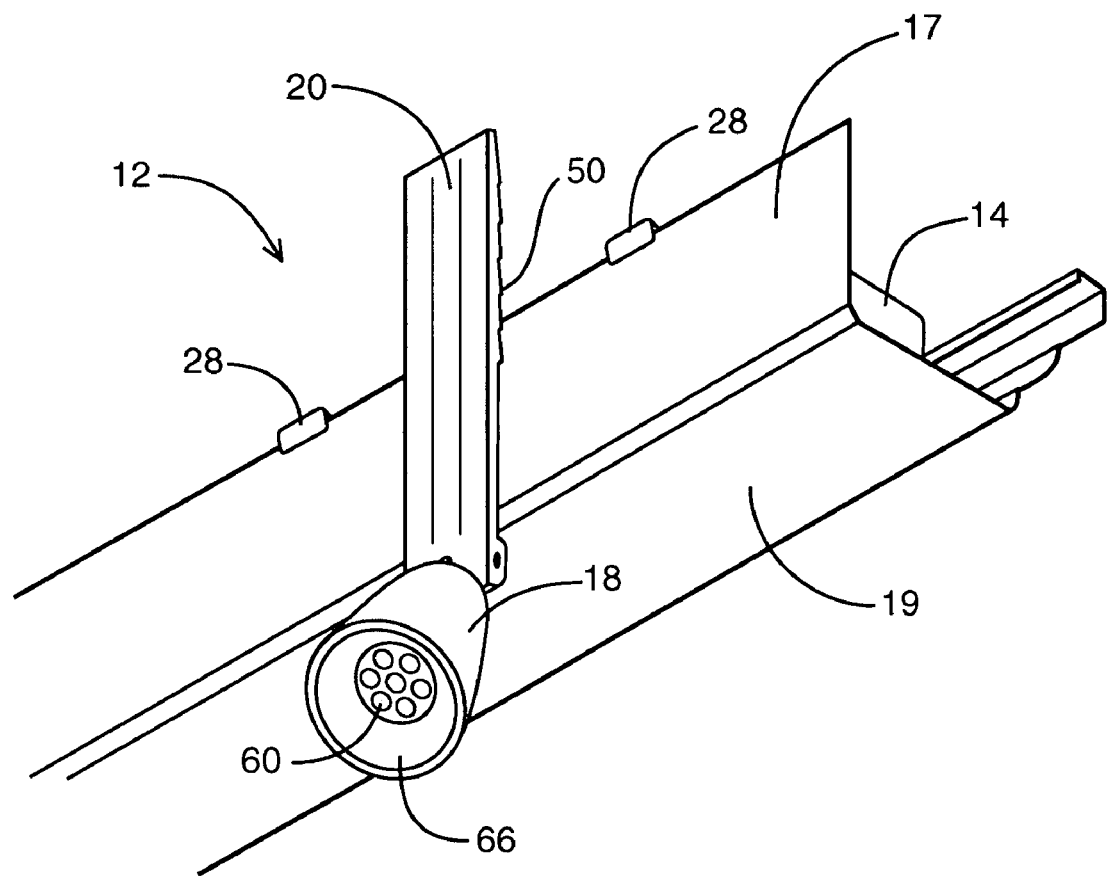
FIG. 3A is a bottom perspective view of the lamp assembly of FIG. 1 when the solar powered lighting assembly is installed within an eaves trough.
Figure 3B:
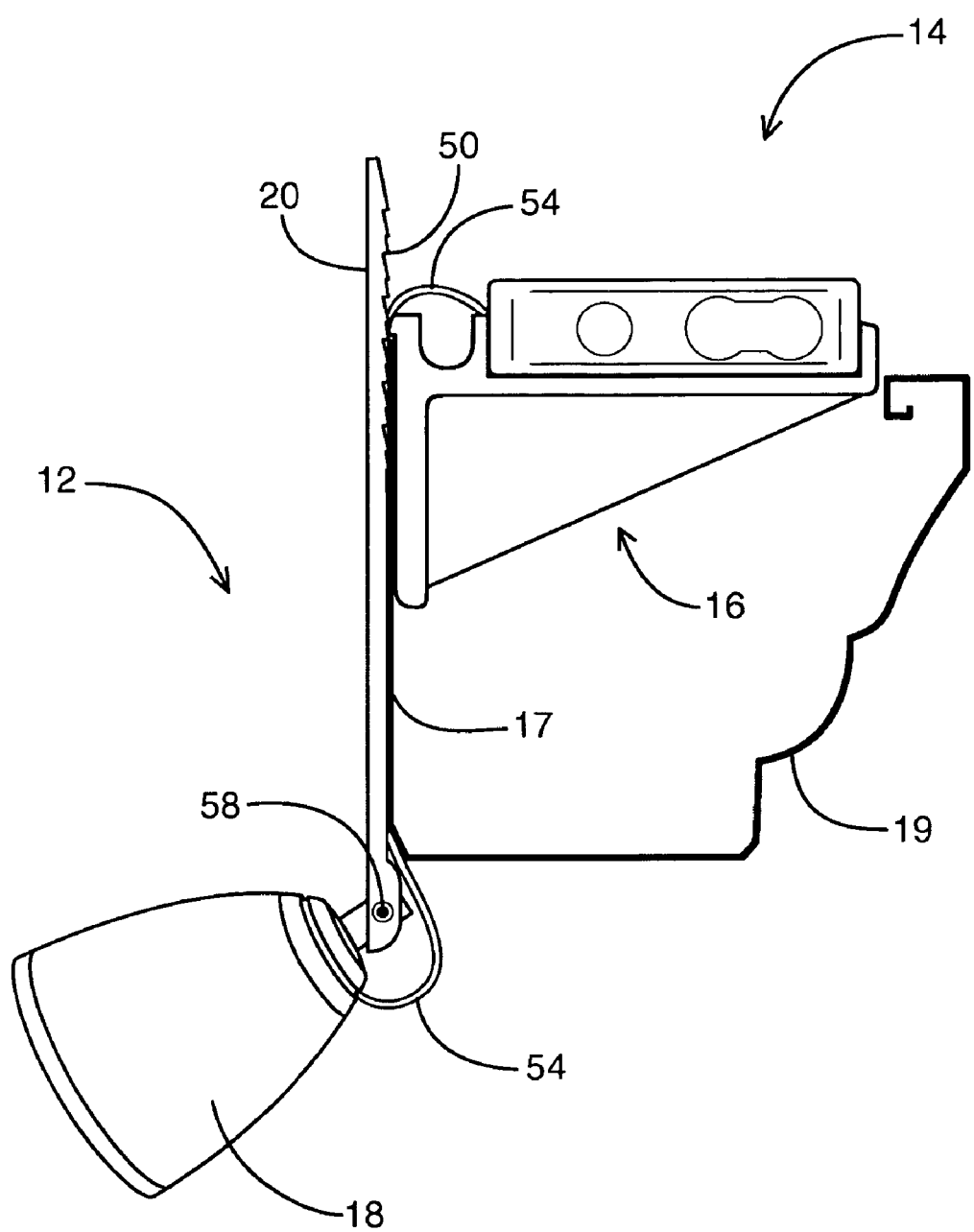
FIG. 3B is a side cross-sectional view of the solar powered lighting assembly of FIG. 1 when the solar powered lighting assembly is installed within an eaves trough.

Connector arm 20 includes a wedge-shaped section 40 containing a plurality of wedge-shaped edges 52 (FIG. 2B). Connector arm 20 is preferably manufactured out of a durable flexible and resilient plastic material which is suitable for industrial use. Connector arm 20 is adapted to be inserted and secured in position between the outer wall surface 15 and eaves trough wall 17 such that the wedge-shaped section 50 is positioned adjacent to eaves trough wall 17 (FIG. 2B). When connector arm 20 is inserted between the outer wall surface 15 and eaves trough wall 17 and wedge shaped section 50 is positioned adjacent to eaves trough wall 17, connector arm 20 can be removably secured at various positions allowing lighting element 18 to be positioned at various desirable distances below the eaves trough 19 as will be described.

Once lighting element 18 is positioned at a desirable distance below the eaves trough 19 (FIGS. 3A and 3B), it is possible to pull the connector arm 20 back slightly so that the closest wedge edge 52 engages the top surface of the eaves trough wall 17 to secure connector arm 20 in place. When it is desired to remove light assembly 12 from solar powered lighting assembly 10, it is possible to push connector arm 20 up slightly while using an implement (e.g. a screwdriver) to produce a sufficient space gap between outer wall surface 15 and eaves trough wall 17 to allow connector arm 20 to be pulled down and disengaged without any wedge edges 52 being caught on the top surface of eaves trough 19. It is also possible to break off end parts of connector arm 20 if desired, although since connector arm 20 can be reused, it may be desirable to retain the full extent of connector arm 20.

While it is preferred to use wedge-shaped section 50 to removably secure light assembly 12 in between outer wall surface 15 and eaves trough wall 17, it should be understood that various other methods of securing connector arm in between outer wall surface 15 and eaves trough wall 17 could also be utilized. Connector arm 20 and lamp element 18 together provide for a vertically and/or horizontally adjustable light source.

It should be understood that while the preferred embodiment is designed to allow lamp element 18 to be positioned below eaves trough 19 such that light is provided to the wall below eaves trough, it should be understood that lamp element 18 can also generally be used to provide light to any reasonably proximate location on the wall and that lamp element 18 can also be positioned above eaves trough 19 to again, provide light to any reasonably proximate location on the wall.

Solar panel assembly 14 includes a solar panel array 22, a solar panel housing 24 and a rechargeable power source 26. Solar panel array 22 contains a plurality of solar panels (FIG. 2A). Solar panel array 22 is preferably implemented using a 0.315 Watt 0.45 volt 700 mA Multicrystalline Silicon solar cells manufactured by Photonic Energy Semiconductor Co. Ltd. In Taiwan. However, it should be understood that any kind of commercially available solar panels which convert solar energy into electrical energy could be used within solar powered lighting assembly 10, depending on their rated performance and the environmental conditions contemplated. Each solar panel within solar panel array 22 is electrically connected to one other as is conventionally known.

Solar panel array 22 is preferably fixed within solar panel housing 24, however solar panel array 22 could also be moveable in various positions to provide for maximum exposure to the rays of the sun. Adjustment to a desired position could be achieved using manual or electrical control means. For example, solar panel array 22 could be manually adjusted at different seasons so that the angle of the array panel is optimized for exposure to the sun. Manual adjustments could be made as seasons change and depending on geographic location of the building on which solar powered lighting assembly 10 is mounted. In another embodiment, the solar array panel may be adjusted using electronic means. The electronic means may be controlled by a remote control. In the latter case, electronic means would be included within solar panel housing 24 (for example in cavity 74) so that the array panel is self-adjusting and tracks the movement of the sun through the sky either continuously or based on computer programming of the device.

Power control circuit 56 (FIG. 4) is a conventionally designed power circuit implemented on a printed circuit board that is used to regulate the supply of electrical power to the lamp 60 as well as to regulate the flow of electrical energy from the solar panel array 22 to rechargeable power source 26 (i.e. to recharge rechargeable batteries). Power control circuit 56 controls the recharging of rechargeable power source 26 by solar panel array 22 to a selected voltage during the day and turns on lamp fixture 18 at night until rechargeable power source 26 discharged to a predetermined voltage. Solar panel array 22 is electrically connected through wires 78 to power control circuit 56 and accordingly light energy received by solar panel array 22 is converted into electrical energy that is provided to power control circuit 56 that in turn is provided to rechargeable power source 26 in an appropriate form of charge. Power control circuit 56 includes a light sensor (not shown) to determine nighttime and to ensure that light fixture 18 is not operational during the day and a manual switch (not shown) to adjust the amount of time that the light should be on (e.g. 4 or 8 hours). A red LED charge light (not shown) is used to indicate when electrical energy is being supplied by the solar array panel array 22 to rechargeable power source 26 (i.e. during a sunny day). Also, a wire plug 76 is used to interface the output power from power control circuit 56 to lamp assembly 12 through power wire 54 (FIG. 2B). The specific implementation of power control circuit 56 should be understood to be conventional.

Solar panel housing 24 is used to provide a watertight enclosure for solar panel array 22 and power source 26 as well as a power control circuit 56, all of which are housed within solar panel housing 24 (FIG. 4). Solar panel housing 24 also includes an end cover 70 that provides a watertight chamber for power source 26 (e.g. AA rechargeable batteries in this case) as shown. When end cover 70 is removed from the end of solar panel housing 24, it is possible to insert power source 26 (e.g. AA rechargeable batteries) into the chamber within solar panel housing 24 as shown. When end cover 70 is secured onto the end of solar panel housing 24, the chamber containing power source 26 is made watertight. It is possible to connect a DC adaptor to the DC adaptor pin 72 when end cover 70 is a secured position.

Mounting brackets 16 include a connector element 28, support arms 30 and a brace element 32. Mounting brackets 16 are preferably manufactured out of durable plastic material, although it should be understood that any durable material (e.g. stainless steel) could be used instead. The substantially C-shaped top ends of connector elements 28 (FIG. 2A) are adapted to snap-fit onto the top edge surfaces of the inner eaves trough wall 17 as shown. Each connector element 28 includes a groove 29 (FIGS. 1, 2B and 3A) that is dimensioned to correspond to the width of the top edge surfaces of eaves trough wall 17. When pressure is applied to the top of connector elements 28 (i.e. applied by manual pressure), since the grooves 29 within connector elements 28 are dimensioned to correspond to the width of the top edge surfaces of eaves trough wall 17, the C-shaped connector elements 28 allow solar panel assembly 14 to be removeably but securely attached to eaves trough wall 17. However, it should be understood that any other conventional coupling method (e.g. drilled holes in connector elements 28 and small screws, a tension based hook and latch mechanism, etc.) could be used to secure connector elements 28 to top edge surfaces of eaves trough wall 17.

It should be understood that while it is preferred for the present invention to use a rechargeable power source 26 in combination with a solar panel array 22 to power lamp assembly 12, lamp assembly 12 could also be powered by any other conventionally available power sources that may or may not be mounted within eaves trough 19. Rather, it is contemplated that more generally, connector arm 20 could be used to mount lamp element 18 above or below an eaves trough through the use of a wedge-shaped section 50 adapted to be positioned in between a outer wall 15 and eaves trough wall 17 regardless of the particular type of power source used. For example, it is contemplated that lamp assembly 12 could be powered by either an AC or DC power source which may or may not be mounted within the eaves trough 19. Power could simply be provided from an AC or DC power source that is mounted below the eaves trough or on the wall. In any case, it is contemplated that the present invention also encompasses the use of a wedge-shaped section 50 of connector arm 20 to secure connector arm 20 in the space between outer wall surface 15 and eaves through wall 17 such that lamp element 18 is provided either below or above the eaves trough.

Figure 5:
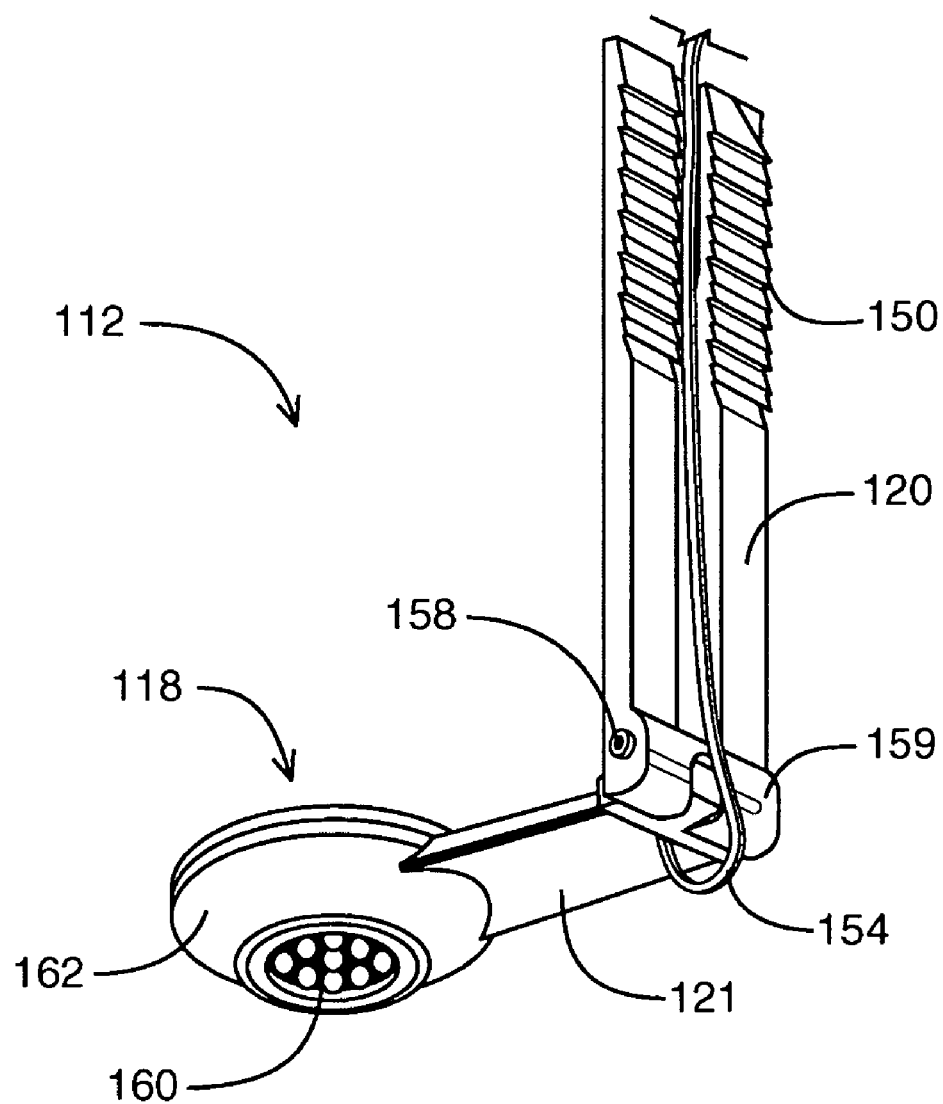
FIG. 5 is a side perspective view of an alternative lamp assembly for use within the solar power lighting assembly of FIG. 1.

FIG. 5 shows an alternative lamp assembly 112 which can be utilized within solar powered lighting assembly 10. Specifically, alternative lamp assembly 112 includes connector arm 120 having a wedge-shaped section 150 and a lamp arm 121 from which extends the lamp element 118. Lamp element 118 includes lamp housing 162, a plurality of LED lamps 160 as well as lamp shield 164. As with lamp assembly 12, lamp 160 is rotatable around a rotation pin 58 that is mounted within rotation cuff 159 that allows for manual adjustment of lamp 160 as well as the light emitted from lamp 160. It should be understood that various other types of lamp fixtures 18 can be used within lamp assembly 12. As discussed previously, it is contemplated that halogen type lamps could be used although such lamps would require slightly stronger support material (e.g. die cast metals) than those contemplated for the LED design discussed above (e.g. durable plastic materials).

Figure 6:
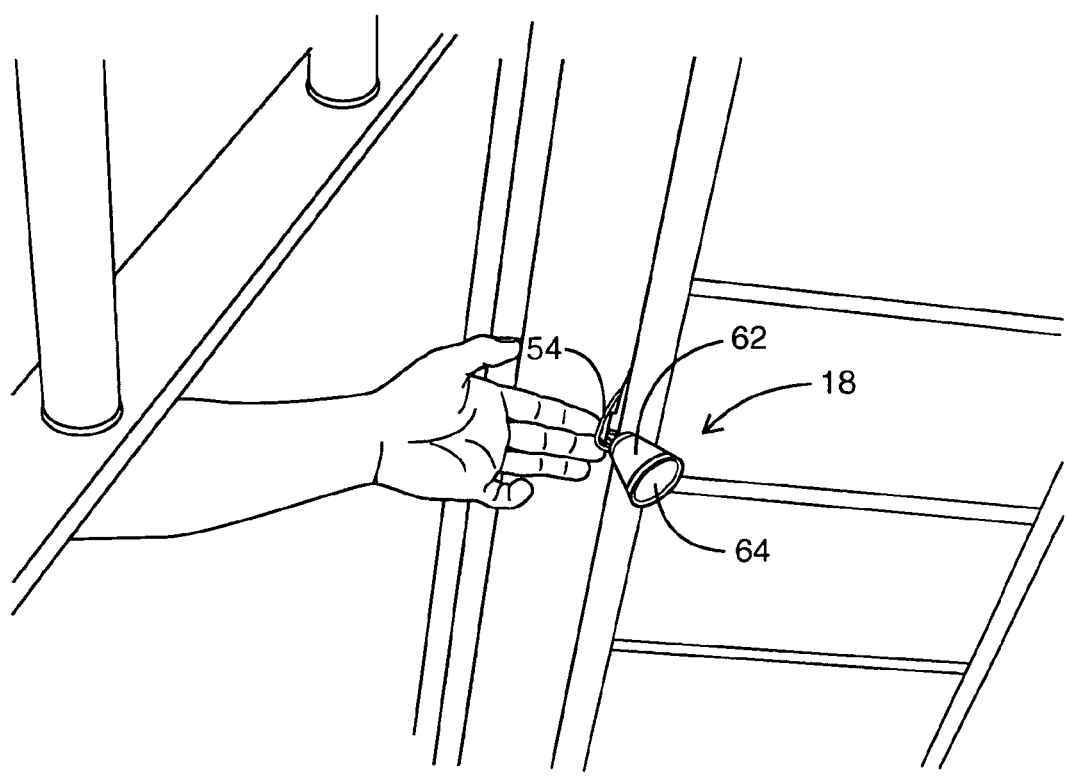
FIG. 6 is a bottom perspective view of the solar power lighting assembly of FIG. 1 installed within an eaves trough that is mounted to a roof where the connector arm of FIG. 1 extends below the roof such that the lamp element of FIG. 1 is positioned to provide spot lighting on the external wall below.

FIG. 6 illustrates how the solar powered lighting assembly 10 looks when looking up from the ground and when mounting bracket 16 is coupled to eaves trough wall 17 and connector arm 20 is inserted in between outer wall surface 15 and eaves trough wall 17. As shown, lamp element 18 is positioned such that lamp 60 is directed to shine light down on the wall surface 150. As has been described the installation of solar powered lighting assembly 10 is relatively straight forward and can be accomplished rapidly and without the need to re-wire or relay electrical wires around the periphery of the building. As can be seen, solar powered lighting assembly 10 provides the ability to easily accentuate the exterior of a building with a decorative soft ambient light. It is contemplated that solar powered lighting assembly 10 could also be used to provide security lighting, commercial lighting effects (e.g. associated with advertising elements), home decorative effects wherever eaves trough 19 exist and the like.

Solar powered lighting assembly 10 provides a number of advantages over commercially available external lighting assemblies. First, the solar powered light assembly 10 can be easily mounted and removed from an eaves trough 19. Second, solar powered lighting assembly 10 can be installed within requiring any re-wiring of existing electrical wiring. Solar array panel 22 can be adjustable in order to maximize the exposure of the solar array panel 22 to the angle of the sun in the sky. Also, solar powered lighting assembly 10 is cost efficient and environmentally friendly which will become a more important feature as energy conservation becomes a more important priority. Accordingly, solar powered lighting assembly 10 provides sustained accessibility to sunlight and preserves the aesthetic appearance of the building.

As will be apparent to those skilled in the art, various modifications and adaptations of the structure described above are possible without departing from the present invention, the scope of which is defined in the appended claims. For example, various modifications can be made including improvements to lighting and LED technology, structural changes in terms of the materials used in the design, different types of solar array technology with a variety of types of solar array panels, modifications to the electrical circuitry and the selection of a suitable rechargeable power supply. The design for the lighting assembly of the present invention may be modified or varied to accommodate such changes in technology choices while remaining within the scope of the claimed invention.

The invention claimed is:

1. A solar powered lighting assembly for attachment to an eaves trough mounted on an outer wall surface, said lighting assembly comprising:
   (a) a lamp;
   (b) a rechargeable power source coupled to said lamp to provide operational power to said lamp;
   (c) a solar panel assembly connected to the rechargeable power source to provide electrical power for recharging the rechargeable power source;
   (d) a mounting bracket coupled to the inside surface of the eaves trough for supporting said rechargeable power source and said solar panel assembly; and
   (e) a connector arm coupled to said lamp, said connector arm containing at least one wedge-shaped protrusion for securing the connector arm between said eaves trough and said outer wall surface.

2. The lighting assembly of claim 1, wherein said lamp further comprises a reflector for focusing the light emitted by said lamp.

3. The lighting assembly of claim 1, wherein said rechargeable power source further comprises an LED charge indicator for indicating that the energy supplied by solar panel array is charging said rechargeable power source.

4. The lighting assembly of claim 1, wherein the vertical position of said connector can be adjusted by moving said connector arm vertically between said eaves trough and said outer wall surface.

5. The lighting assembly of claim 1, wherein said lamp is rotatably coupled to said connector arm such that the position of lamp relative to the connector arm can be manually adjusted.

6. A lighting assembly for attachment to an eaves trough mounted on an outer wall surface, said lighting assembly comprising:
   (a) a lamp;
   (b) a power source connected to said lamp to provide operational power to said lamp; and
   (c) a connector arm coupled to said lamp, said connector arm containing at least one wedge-shaped protrusion for securing the connector arm between said eaves trough and said outer wall surface such that said lamp is positioned to provide light on the outer wall surface.

7. The lighting assembly of claim 6, wherein said lamp further comprises a reflector for focusing the light emitted by said lamp.

8. The lighting assembly of claim 6, wherein the vertical position of said connector can be adjusted by moving said connector arm vertically between said eaves trough and said outer wall surface.

9. The lighting assembly of claim 6, wherein said lamp is rotatably coupled to said connector arm such that the position of lamp relative to the connector arm can be manually adjusted.

10. A kit for assembling a solar powered lighting assembly for attachment to an eaves trough mounted on an outer wall surface, said kit comprising:
   (a) a lamp;
   (b) a rechargeable power source adapted to be coupled to said lamp to provide operational power to said lamp;
   (c) a solar panel assembly adapted to be coupled to the rechargeable power source to provide electrical power for recharging the rechargeable power source;
   (d) a mounting bracket adapted to be coupled to the inside surface of the eaves trough for supporting said rechargeable power source and said solar panel assembly; and
   (e) a connector arm adapted to be coupled to said lamp, said connector arm containing at least one wedge-shaped protrusion for securing the connector arm between said eaves trough and said outer wall surface.

* * * * *